United States Patent [19]

Everett et al.

[11] Patent Number: 4,767,097

[45] Date of Patent: Aug. 30, 1988

[54] STACKED SERVOID ASSEMBLY

[75] Inventors: William F. Everett, 205 Mt. Vernon Dr., Goshen, Ind. 46526; Richard L. Dalton, Jr., 51040 Northfield Dr., Granger, Ind. 46530; Randall L. Bixler, 1328 E. LaSalle Ave., South Bend, Ind. 46617

[73] Assignees: William F. Everett, Goshen; Richard L. Dalton, Jr., Granger; Randall L. Bixler, South Bend, all of Ind.

[21] Appl. No.: 32,050

[22] Filed: Mar. 27, 1987

[51] Int. Cl.⁴ .............................................. F16K 31/06
[52] U.S. Cl. ........................... 251/129.08; 251/129.14; 251/129.17; 251/129.18; 29/157.1 R
[58] Field of Search ...................... 251/129.17, 129.18, 251/129.14, 129.08; 29/157.1

[56] References Cited

U.S. PATENT DOCUMENTS 2,697,581 12/1954 Ray ............................. 251/129.18 X
3,529,620 9/1970 Leiber ......................... 251/129.18 X
4,463,332 7/1984 Everett ........................... 335/273 X
4,640,391 2/1987 Maehara et al. ........... 251/129.18 X

FOREIGN PATENT DOCUMENTS 0123068 9/1980 Japan ............................... 251/129.17

Primary Examiner—Arnold Rosenthal
Attorney, Agent, or Firm—Barnes & Thornburg

[57] ABSTRACT

A valve-proportional solenoid arrangement is provided in a unitary housing. The spring elements of the solenoid are mounted within this housing in the nature of a clamped cartridge. Fluid movement through the valve is adjustable by either movement of the valve seat or the solenoid polepiece within the housing. The solenoid elements are secured into the housing by a threaded cap at one end. The valve elements are secured into the housing by a threaded cap at another end. In alternative embodiments, to assist in threaded securing of the armature to the retainer, portions of the circumference are flattened, although without altering the working area of the magnetic field with respect to the polepiece.

9 Claims, 3 Drawing Sheets

STACKED SERVOID ASSEMBLY

BACKGROUND AND SUMMARY OF THE INVENTION

The present invention relates generally to solenoid assemblies and, more particularly, to such assemblies utilized in valve actuation. Further, the present invention relates to rectilinear motion proportional solenoids.

This invention provides a novel improvement upon the invention disclosed in U.S. Pat. No. 4,463,332, which issued July 31, 1984 to one of the co-inventors of the present invention. Both inventions have been assigned to South Bend Controls, Inc. The complete disclosure and specification of that issued patent is specifically incorporated herein by reference.

In the past, valve housings and solenoid housings have been separately manufactured and assembled. Subsequently, these separate elements have been connected together to permit the solenoid to actuate the valve. For example, as shown in FIG. 1 of U.S. Pat. No. 4,463,332, valve housing 80 is connected to solenoid housing 12 via threads 14. However, forming the completed housing assembly from multiple component parts is time consuming and expensive. Further, additional sealing is required between the separate components, especially in wet coil environments. Also, multi-component assemblies are more susceptible to temperature instabilities, especially across the component junctures. In addition, since valve performance is typically critically dependant upon precise dimensioning and locating of the housing components, multi-component housings can have reduced performance ratings.

Further, an important concern with linear proportional solenoids is with the attachment of the springs within the solenoid. In the above-noted patent, for example, springs 69 and 70 were brazed into place at specially formed ridges 73. This brazing can cause certain metals to lose their temper. Furthermore, it was sometimes difficult to determine precisely how a specific material would react after such heating. As a result, post-brazing heat treatments and special metal alloys were used in the springs to retain the temper and maintain relatively consistent spring characteristics. Unfortunately, this can preclude utilization of more diverse specialty spring materials which would otherwise be desirable in particular valve environments.

Therefore, it is an object of the present invention to provide an improved housing and assembly for solenoid-actuated valve constructions.

Another object is the provision of a solenoid-valve assembly of reduced weight and manufacturing cost.

A further object is to provide a solenoid-valve assembly with improved temperature stability and performance characteristics.

Yet another object is the provision of a method of solenoid assembly wherein spring elements are secured without brazing.

Yet a further object is to provide a method of solenoid assembly wherein spring element composition and operating characteristics can be optimized for particular environments.

Yet still a further object is the provision of a solenoid actuated valve having improved versatility.

These and other objects of the present invention are attained by the provision of a valve-proportional solenoid arrangement in a unitary housing. The spring elements of the solenoid are mounted within this housing in the nature of a clamped cartridge. Fluid movement through the valve is adjustable by either movement of the valve seat or the solenoid polepiece within the housing. The solenoid elements are secured into the housing by a threaded cap at one end. The valve elements are secured into the housing by a threaded cap at another end. To assist in threaded securing of the armature to the retainer, in alternative embodiments portions of the circumference are flattened, although without altering the working area of the magnetic field with respect to the polepiece.

Other objects, advantages and novel features of the present invention will become readily apparent upon consideration of the following description of the preferred embodiments in conjunction with the drawings.

DESCRIPTION OF THE PREFERRED EMBODIMENTS

Figure 1:
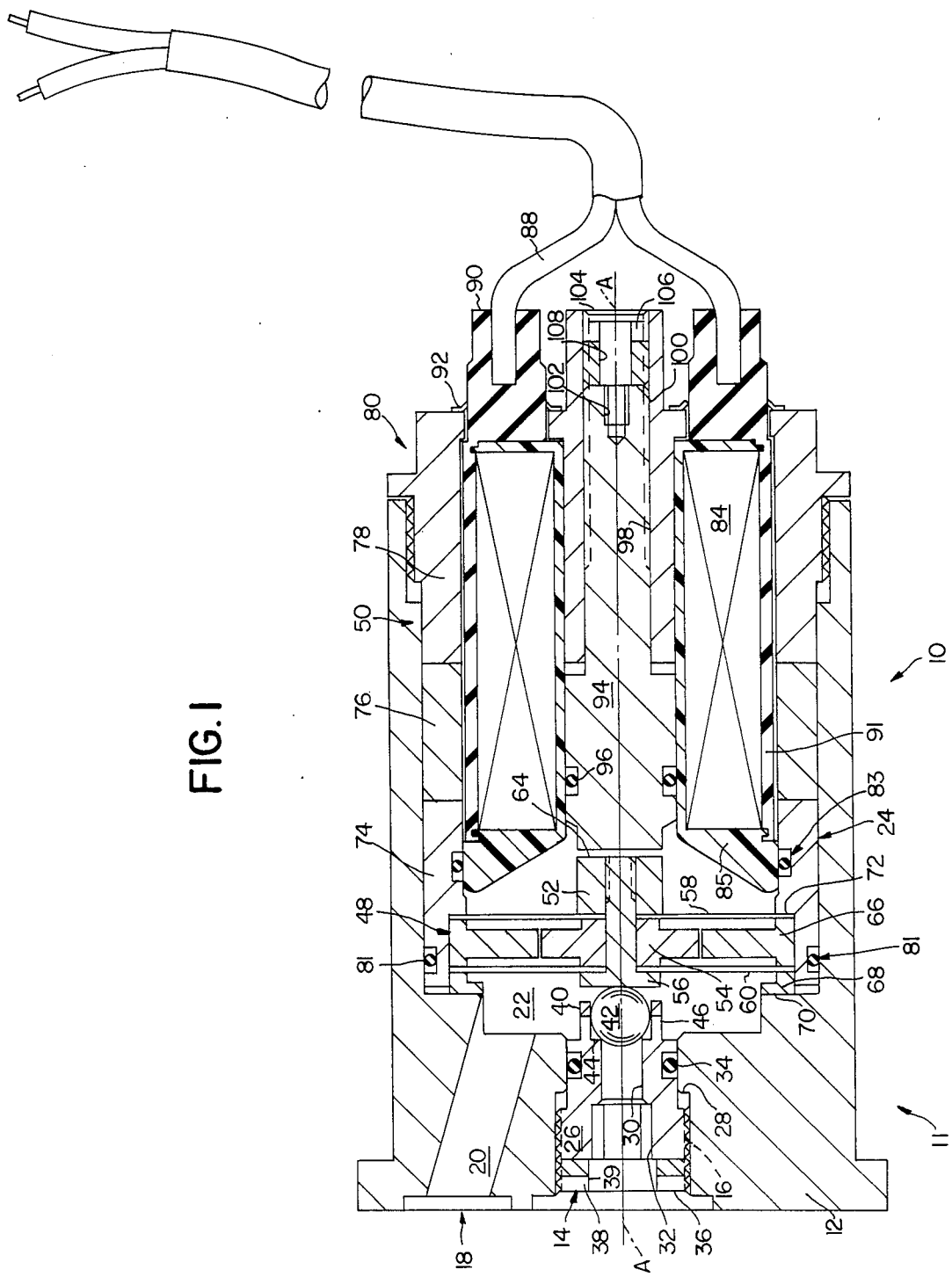
FIG. 1 shows a side cross-sectional view of the present invention.
Figure 2:
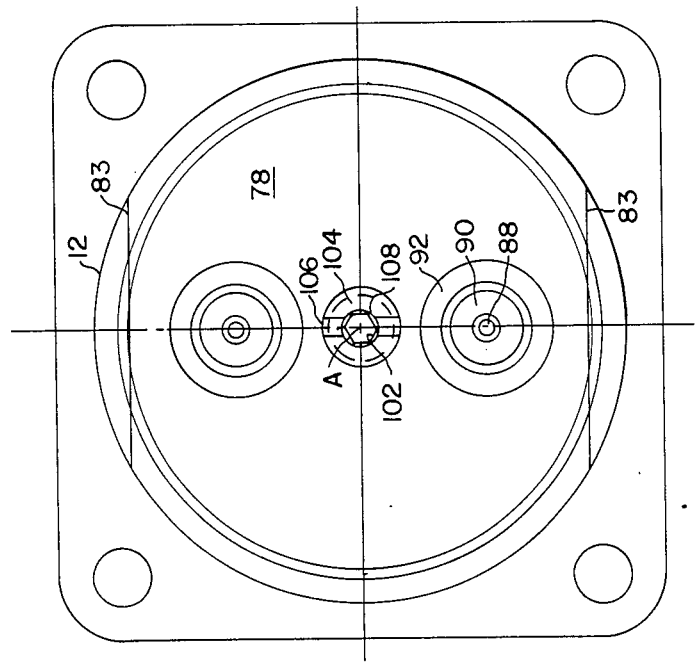
FIG. 2 shows a right elevational view of the embodiment of the present invention illustrated in FIG. 1.
Figure 3:
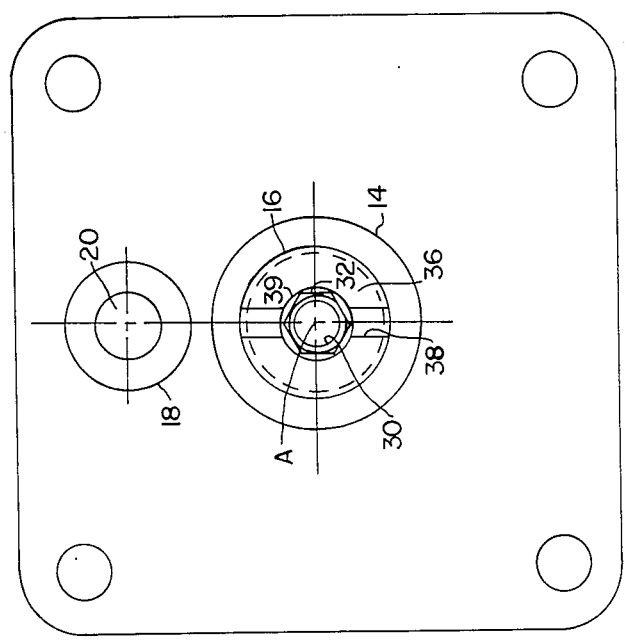
FIG. 3 shows a left elevational view of the embodiment of the present invention illustrated in FIG. 1.

FIG. 1, which illustrates a preferred embodiment of the present invention, shows a stacked, linear proportional solenoid 10 in combination with a fluid control valve 11. Both devices are mounted within a unitary, integrally formed housing 12. This housing is, for example, generally cylindrical in shape, the view of the drawing being cross-sectional along longitudual axis A of that cylinder. The drawing of the present invention can be compared advantageously to FIG. 3 of the above-noted patent.

Housing 12 includes inlet port 14 and outlet port 18 leading to and from valve 11 through passageways 16 and 20, respectively. Passageways 16 and 20 are joined by chamber 22. Housing 12 also includes bore 24 extending from chamber 22.

Valve retainer 26 is adjustably threaded into passageway 16 up to the maximum penetration determined by shoulder 28. Valve retainer 26 includes bore 30 to permit fluid flow through the valve retainer to chamber 22. Portion 32 of bore 30 is, for example, keyed about its interior surface to receive a similarly keyed tool or wrench (not shown) for adjusting the position of valve retainer 26. Past shoulder 28, valve retainer 26 also includes a circumferential fluid seal 34. In especially preferred embodiments, valve retainer 26 is secured within passageway 16 by threaded locking nut 36. This nut is illustrated in the drawing as being adjustable by insertion of a flat edged tool, such as a screwdriver (not shown), into lateral slot 38. Locking nut 36 also includes an aperture 39 in registration with portion 32 and dimensioned so as to permit adjustment access by the keyed tool.

End portion 40 of valve retainer 26 extends into chamber 22 and serves as a support and a guide for ball element 42. This ball element is slidably disposed within end portion 40 and is engagable with valve seat 44 to control fluid flow from bore 30 to passageway 20. In especially preferred embodiments, ball element 42 is urged out of sealing engagement with valve seat 44 by fluid pressure in bore 30. As ball element 42 slides to the right, as viewed in FIG. 1, fluid moves past valve seat 44 and into chamber 22 and passageway 20 via at least one lateral port 46 in end portion 40.

Solenoid 10 is mounted within bore 24. Solenoid 10 includes armature assembly 48 and core assembly 50. Armature assembly 48 is disposed adjacent chamber 22 and includes, in series, armature portion 52, armature plate 54 and armature retainer 56 with flat springs 58 and 60 clamped therebetween. Armature retainer 56 is threadably received within armature portion 52 to secure this clamping relation.

Figure 4:
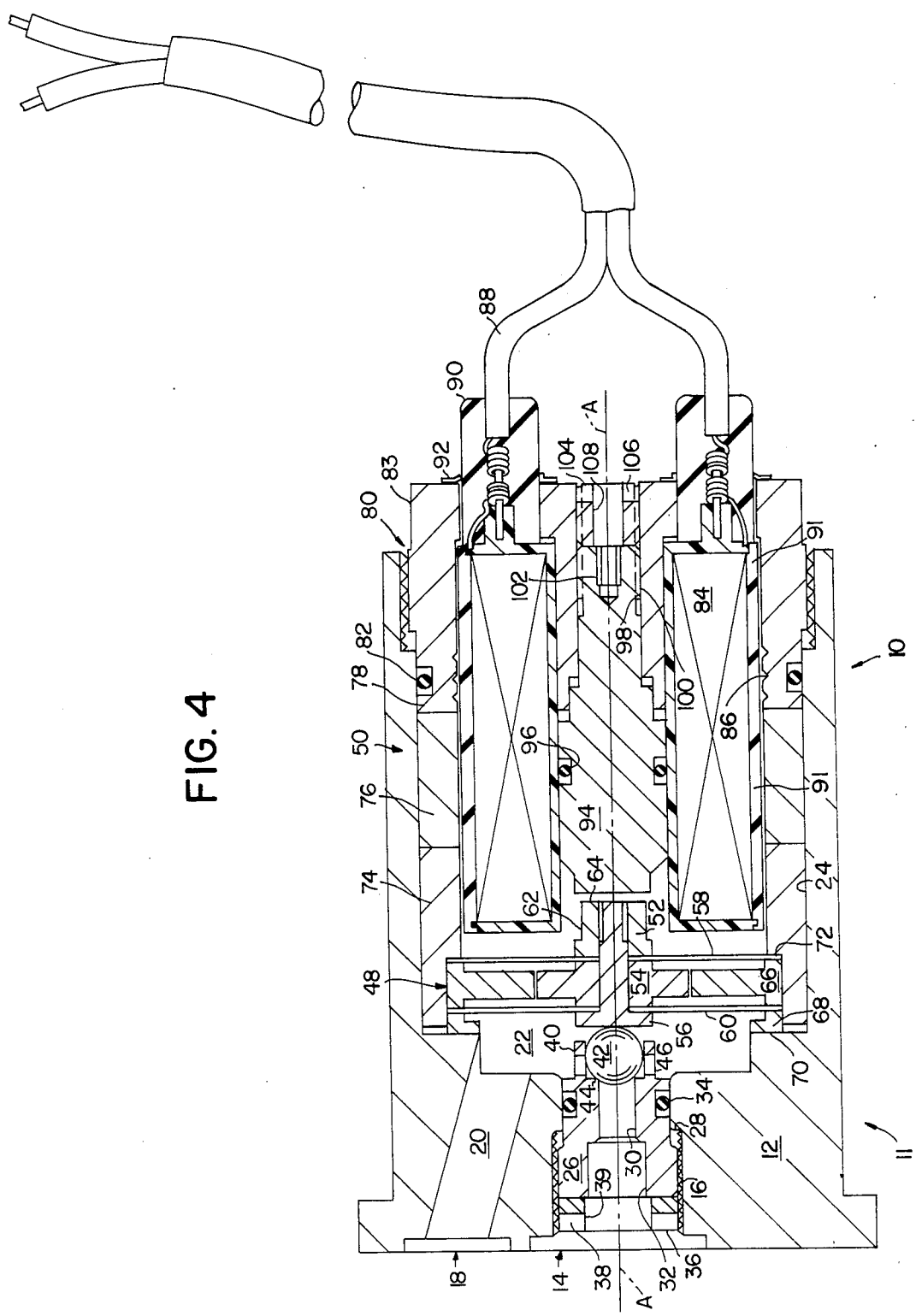
FIG. 4 shows a side cross-sectional view of an alternative embodiment of the present invention.

In alternative embodiments of the present invention, such as that shown in FIG. 4, the end face of armature 54 is unlike that of U.S. Pat. No. 4,463,332. Specifically, the end face (not shown) of armature portion 52 would include at least a pair of opposing flattened sides 62 such that it is not circular. These flattened sides permit the armature portion to be more readily gripped when armature retainer 56 is threaded therein. In certain embodiments of the present invention, armature retainer 56 may have similarly flattened sides. However, end face area 64 of armature portion 52 is still dimensioned to be equal to the end face area of the polepiece, such that the magnetic flux across the gap between the armature and the polepiece is unaffected, as compared with the device of the above-noted patent.

Spring ring 66 is mounted between the interior faces of springs 58 and 60 at the outer circumferential edges of those springs. As in U.S. Pat. No. 4,463,332, spring ring 66 is spaced apart from armature plate 54, and thus, armature portion 52 is mounted as a cantilever from the outer circumference of spring ring 66. However, springs 58 and 60 are not brazed to spring ring 66.

When the armature assembly is mounted within bore 24, spacer 68 is disposed between end shoulder 70 of bore 24 and the outer circumferential edge of the exterior face of spring 60. Spacer 68 is dimensioned to permit armature retainer 56 to be positioned adjacent ball element 42. The relative position of the ball element and the armature assembly are thus adjustable by spacer 68 and threadable valve retainer 26 such that ball element 42 can normally seal against valve seat 44. The amount of normal fluid flow to passageway 20 can then be controlled by threading adjustment of valve retainer 26. In certain alternative embodiments, the present invention contemplates that spacer 68 would be integrally formed with shoulder 70.

When armature assembly 48 is mounted within bore 24, the outer circumferential edge of the exterior face of spring 58 is engaged by shoulder 72 of core ring 74 in core assembly 50. In this manner, springs 58 and 60 are also securely clamped between spacer 68, spring ring 66 and core ring 74.

Core assembly 50 also includes annular permanent magnet 76 and cap ring 78. These latter two elements can be mounted sequentially within bore 24 after core ring 74. Cap ring 78 is threadably secured at open end 80 of bore 24 and serves to retain the solenoid components in stacked relation within bore 24. Seal 81 is provided at the outer circumference of core ring 74 to prevent fluid leakage along the core assembly. Alternatively, cap ring 78 includes a circumferential fluid seal 82, as shown in FIG. 4. To assist in threading cap ring 78, preferred embodiments include at least a pair of opposing flattened sides 83 at the end circumference of the cap ring.

Seal 83 is provided at the inner circumference of core ring 74 to prevent fluid leakage between the core assembly and coil 84. End wall 85 of coil 84 is enlarged as shown in FIG. 1 to facilitate this sealing. Alternatively, electromagnetic coil 84 can be retained and sealed within cap ring 78 by, for example, an adhesive component disposed in grooves 86, as shown in FIG. 4. Wire leads 88 supply current to coil 84. Plug portions 90 support and located wire leads 88 with respect to coil 84. Lock rings or clips 92 secure plug portions 90 with respect to cap ring 78. Where plug portions 90 are integrally formed or interlocked with the supporting walls 91 of coil 84, clips 92 may be sufficient to securely retain coil 84 within cap ring 78 without the use of adhesives, as shown in FIG. 1.

Polepiece 94 is adjustably mounted within coil 84 and preferrably includes a circumferential fluid seal 96. Polepiece 94 includes a threaded stem portion 98 which is received within threaded aperture 100 of cap ring 78. Keyed recess 102 is formed in stem portion 98 and is dimensioned so as to enable a similarly keyed tool or wrench to be received therein and cause threaded rotation of stem portion 98. Such rotation results in selected movement of polepiece 94 along axis A toward or away from the end face of armature portion 52.

Stem portion 98 is secured within aperture 100 by threaded locking nut 104. This nut is illustrated in the drawing as being adjustable by insertion of a flat edged tool, such as a screwdriver (not shown), into lateral slot 106. Locking nut 104 also includes an aperture 108 in registration with aperture 102 and dimensioned so as to permit adjustment access by the keyed tool. Once polepiece 94 is properly adjusted, aperture 108 is preferably filled with epoxy to prevent tampering.

In general, the active component placement and relative spacing in the present invention resembles that found in the patented invention. Thus, as the electromagnetic field arrangement of the present invention is similar to that of the previously patented device, those skilled in the art will now recognize that the respective operating characteristics of the two devices are similarly related. Accordingly, the operation of the present invention need not be discussed in detail herein.

Briefly, when the solenoid is actuated by current in coil 84, the magnetic field between polepiece 94 and armature portion 52 tends to draw the armature assembly toward the polepiece, depending upon the amount of current used. As armature retainer 56 thus is moved away from ball element 42, fluid pressure from bore 30 moves the ball element away from valve seat 44, permitting greater fluid flow to passageway 20. When current to the solenoid is reduced, the biasing force of springs 58 and 60 overcome the magnetic force. Armature retainer 56 is thus moved by the springs to urge ball element 42 back toward the valve seat and thereby restrict fluid flow.

Unlike the prior device, however, the present invention permits a wide variety of materials to be employed as springs 58 and 60 without loss of precision. For example, metal alloys which would not be suitable for use in a brazed assembly can now be reliably employed. Thus, the operating characteristics of the present invention can be more precisely and cost-effectively tailored to the needs and environment of the specific end use. For example, the arrangement of the present invention has widespread applications with respect to liquid flow metering and can function advantageously in a wet coil environment.

Further, with the unitary valve-solenoid housing construction, the present invention permits greater flexibility in valve and armature control. For example, through threaded valve seat 26, the valve spacing can be directly altered to permit predetermined levels of fluid flow even in the normal or non-actuated armature assembly position.

Also, the method of manufacture for valve-solenoid assemblies has been simplified without significant loss of accuracy or reliability by the slide-in stacking of components in the present invention. For example, solenoid 10 or valve 11 can be stacked into assembly first and then slid as a unit into housing 12. Alternatively, each solenoid component can be dropped into place automatically within housing 12 and subsequently calibrated. Coupled with this assembly time reduction, the lessor number of components required by the present invention provides significant cost savings. Furthermore, repair and maintenance costs are similarly reduced because of the ease of disassembly and replacement. At the same time, the unitary housing avoids inaccuracies in performance and calibration that have been of concern with previous devices.

Although the present invention has been described in detail, the same is by way of illustration and example only and is not to be taken by way of limitation. The spirit and scope of the present invention are to be limited only by the terms of the appended claims.

What is claimed is:

1. A valve actuating apparatus having a valve assembly and a proportional solenoid assembly, comprising:
   a unitary housing having a fluid inlet, a fluid outlet and a fluid passageway therebetween, said housing also having a bore in communication with said fluid passageway;
   said valve assembly being adjustably mounted within said fluid passageway for controlling fluid flow therethrough;
   said solenoid assembly being mounted within said bore and having an armature member adjacent said valve assembly in said fluid passageway;
   said valve assembly having a valve seat and valve element cooperatively associated therewith for restricting fluid flow past said valve seat, said valve element normally disposed in contact with said armature member;
   said armature member including spring biasing means for normally retaining said armature member in contact with said valve element;
   said spring biasing means being fixedly clamped at one edge with respect to said housing by said solenoid assembly and being fixedly clamped at another edge with respect to said armature member; and
   said solenoid assembly being actuatable to move said armature away from said valve element such that increased fluid flow is permitted past said valve seat.

2. The apparatus according to claim 1 wherein said valve element is normally biased toward said armature and apart from said valve seat.

3. The apparatus according to claim 1 wherein said valve assembly is externally adjustable so as to selectively control the amount of normal fluid flow past said valve seat when said solenoid assembly is not actuated.

4. The apparatus according to claim 3 wherein said solenoid assembly is externally adjustable so as to selectively control the distance of movement of said armature away from said valve element and thereby control the amount of increased fluid flow past said valve seat when said solenoid assembly is actuated.

5. The apparatus according to claim 1 wherein said valve assembly is externally adjustable so as to selectively control the normal spacing between said valve seat and said valve element.

6. The apparatus according to claim 5 wherein said armature member is disposed so as to bias said valve element toward sealing engagement with said valve seat.

7. The apparatus according to claim 1 wherein said solenoid assembly further includes a polepiece member having an end face adjacent and spaced apart from said armature member so as to establish a magnetic field therebetween, said armature member having an end face confronting said polepiece end face and through which pass the flux lines of said magnetic field, said armature end face having the same total surface area as said polepiece end face, but being of a different configuration.

8. A method for constructing an apparatus having a valve assembly and a solenoid assembly operably associated with said valve assembly so as to cause selective actuation thereof, comprising the steps of:
   initially, forming a unitary housing having a fluid passageway therethrough and bore intersecting said fluid passageway, forming said valve assembly as a unit to include a valve seat, a valve element sealingly engagable with said valve seat, and a support means for locating said valve element apart from said valve seat,
   forming said solenoid assembly as a unit to include an armature cartridge and a core actuating cartridge,
   said armature cartridge including spring means and an armature portion clamped onto one edge of said spring means so as to be cantilevered therefrom,
   said armature cartridge being supported at one end of said core actuating cartridge;
   and subsequently inserting said valve assembly as a unit into said fluid passageway and inserting said solenoid assembly as a unit into said bore; and
   adjustably mounting said valve assembly with respect to said solenoid assembly such that said valve element is actuatable by said armature portion,
   said spring means being fixedly clamped at another edge between said core actuating assembly and at least a portion of said housing.

9. The method of construction according to claim 8 wherein said valve assembly is threadably mounted in said passageway and externally adjustable so as to control the normal seating of said valve element.

* * * * *

UNITED STATES PATENT AND TRADEMARK OFFICE
CERTIFICATE OF CORRECTION

PATENT NO. : 4,767,097

DATED : August 30, 1988

INVENTOR(S) : William F. Everett, et al.

It is certified that error appears in the above-identified patent and that said Letters Patent is hereby corrected as shown below:

```
Please delete the assignment information at item
[73] on the abstract sheet of the following patent
and substitute the following:

Assignee:  South Bend Controls, Inc.
              South Bend, Indiana
```

Signed and Sealed this

Seventh Day of February, 1989

Attest:

DONALD J. QUIGG

Attesting Officer

Commissioner of Patents and Trademarks